Nov. 3, 1936.  L. P. MANNES ET AL  2,059,884
COLOR PHOTOGRAPHY
Filed Sept. 21, 1932  2 Sheets-Sheet 1

Inventors:
Leopold D. Mannes &
Leopold Godowsky, Jr.,

By  Newton M. Perrins
Attorney.

Patented Nov. 3, 1936

2,059,884

UNITED STATES PATENT OFFICE 2,059,884

COLOR PHOTOGRAPHY

Leopold D. Mannes and Leopold Godowsky, Jr., Rochester, N. Y., assignors, by mesne assignments, to Eastman Kodak Company, Jersey City, N. J., a corporation of New Jersey Application September 21, 1932, Serial No. 634,182

20 Claims. (Cl. 95—2)

This invention relates to a three-color photographic process and one which is particularly adapted to color motion pictures. It comprises a method whereby a two-color negative is processed as a three-color positive.

The process involves a number of new and novel steps, some of which lead to simplifications in the apparatus and operations necessary. These steps will be apparent from the following description and from the drawings in which.

Figure 1:
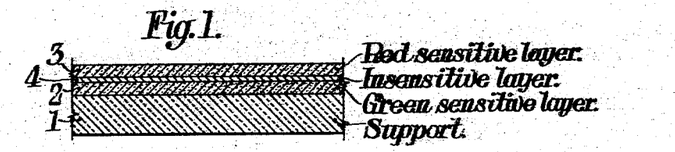
Fig. 1 is a diagrammatic cross-section of the negative film used.
Figure 2:
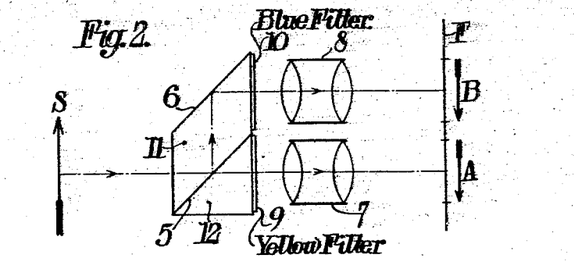
Fig. 2 is a diagrammatic representation of the film in place in a split-beam two-color camera.
Figure 3:
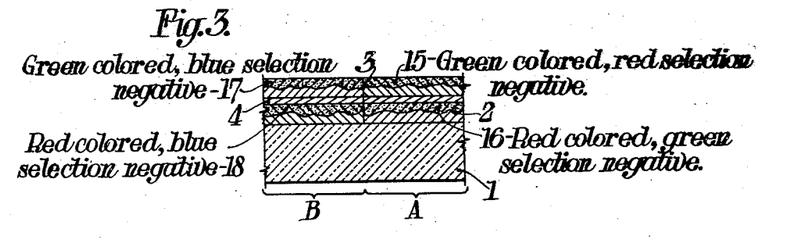
Fig. 3 is a cross-section of the negative material after it is processed.

The process will first be briefly outlined and will then be fully described. In one of its forms, it is carried out as follows: The negative film F as shown in Fig. 1 consists of a support 1 carrying superposed layers of green and red sensitized emulsions designated 2 and 3 respectively having a thin intermediate layer of unsensitized gelatine 4. This negative film F is exposed in split-beam two-color camera of the type shown in Fig. 2 which will be more fully described hereinafter. Alternate frames A and B are exposed through suitable filters to yellow (red plus green) and blue light respectively. This negative is then processed by developing the layer nearest the support in a color developer to form an image of a minus green color and in the top layer is developed an image of a minus red. As shown in Fig. 3, in this color developed negative the red record image 15 is found in area A in the upper layer colored a minus red. The green record image 16 is found in area A in the lower layer and is colored a minus green. The blue record image is found in both layers in area B, the portion 17 in the upper layer being colored minus red and the portion 18 in the lower layer being colored minus green.

Figure 4:
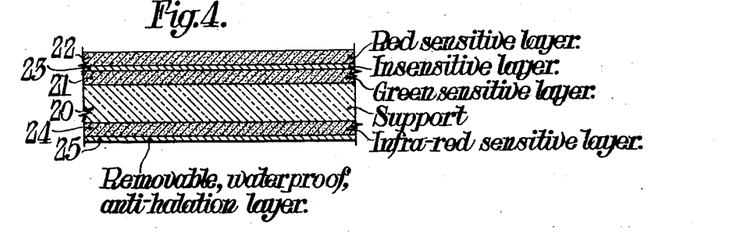
Fig. 4 is a cross-section of the positive film before processing.

This negative is then printed by projection upon a new type of positive film which is illustrated in Fig. 4. It comprises a support 20 having on one side superposed layers 21 and 22 of highly transparent emulsion, the lower 21 being sensitized to green and the upper 22 to red light and separated by a thin gelatine layer 23 and on the other surface carrying a layer 24 sensitive to infra-red light. The printing is done by projecting the alternate frames in super-position upon the positive film. The red and green record frame A (taken through the yellow filter) is printed on the double coated side of the positive film through a minus blue filter and through a dilute copper sulfate solution which cuts off the infra-red rays which would otherwise affect the emulsion on the reverse side of the film. The blue record frame is printed by light of about 720–850 m$\mu$ on the water-proof single infra-red sensitive emulsion on the reverse side of the film. This may be done by an optical printer of a known type in which the image is brought to the reverse side by means of prisms and mirrors, but we prefer the much simplified method of printing this image through the double layer on the front of the positive film and we have accordingly made a positive film which will permit of this being done successfully. This film and the method of printing will later be described more in detail.

It is to be understood that all the layers described in this specification are more or less blue sensitive and care must be taken to exclude blue rays when these layers are intended to record only light records other than blue.

The result of the printing as described is to print the minus red colored image 15 of the negative film representing the red record component, in the red sensitized top coating 22 of the positive film. The minus green colored image 16 is printed on the green sensitive positive lower layer 21. Both of these color records are found in frame A of Fig. 3. Frame B is printed by infra-red light on the reverse side of the positive either by projection through the other two layers or by optical means as stated. In the resulting positive the red component is in the top layer and is to be processed to a minus red color. The green component is in the second layer next the support and is to be processed to minus green, and the blue record has been printed by infra-red light on the reverse side, and is to be processed to a minus blue or yellow.

The three-layer positive as now printed is then processed in color developers with a suitable technique to give the results indicated. This gives a three-color positive shown in Fig. 8 which has been produced from a two-color negative. The full details of the process will now be described, it being understood that numerous modifications and equivalents are possible.

Negative material

For the negative a film is used carrying two superposed emulsion layers on the same side of the film base. Between these two emulsion layers is a very thin layer of clear gelatine. The two emulsion layers are differentially sensitized with dyes to light of different regions of the spectrum. In practice the following negative material has been found to give the best results.

The film base 1 is first coated with a layer 2 of a thickness of the order of .0002 inch of a very rapid emulsion sensitized to the green region of the spectrum between 510-590 m$\mu$, with a maximum at about 550 m$\mu$. A fast emulsion sensitized with erythrosin has been found satisfactory. Over this emulsion is coated a very thin layer of gelatine 4. The final top coating 3 is of the same order of thickness as layer 2 and is a red sensitized rapid emulsion which has been diluted with an equal weight of gelatine before coating to give greater transparency, less density, less tendency to exhaust the developer diffusing through it, and finally, less tendency to harden the gelatine where the image develops. For this top emulsion layer a fast emulsion has been used, sensitized with a red sensitizer conferring sensitivity primarily in the region between 600 and 700 m$\mu$ with a maximum near 650 m$\mu$. Such a sensitizer is naphthocyanol. Both layers are, of course, sensitive to blue.

It is important for this red sensitized layer to use an emulsion that is relatively insensitive to light of wave-lengths around 520-530 m$\mu$. For the lower green sensitized emulsion this restriction is not necessary, as will be seen. The total thickness of the coatings of this material altogether should not substantially exceed the thickness of a single normal coating on negative motion picture film as ordinarily supplied.

It is naturally important that these two emulsions, as finally coated, have very similar essential characteristics of latitude, speed, contrast, and maximum density.

The unsensitized clear gelatine intermediate layer affords protection against possible wandering of the sensitizing dyes from one emulsion to the other.

Negative exposure

The film is exposed in a camera of the split beam type which exposes two adjacent frames simultaneously to the same light image. Such a suitable camera is illustrated diagrammatically in Fig. 2. A light from the subject S is transmitted by the special optical system to the film as shown. A rhomb 11 of optical glass has cemented to one face a glass prism 12 which is partially silvered along the face 5, being either of the semi-transparent type or having transmitting or reflecting areas. The face 6 of the rhomb is completely silvered. As indicated by the diagram, this system will give rise to two images, one through the face 5 and one from the face 6, which are transmitted by objectives 7 and 8 through corresponding filters 9 and 10 to the two frames A and B of the negative film F. In the ensuing description we shall call any simultaneously exposed pair of frames A and B respectively. It is understood that any color selection camera of familiar type may be used and that the exposures of successive frames may be made consecutively instead of simultaneously.

In the path of the beam falling on frame A is a sharp cutting yellow filter 9, of well known type absorbing practically all the blue light, and transmitting red and green light. As the red sensitive coating 3 of the negative film is practically insensitive to light between 510-590 m$\mu$ it will record through the yellow filter only the red light component of a tri-color system. The lower green sensitive layer 2 will correspondingly record only the green component ranging from approximately 510-590 m$\mu$. Owing to the relatively larger exposure required for obtaining two correct differential color component records on frame A as described, the partial reflecting surface 5 in front of lens 7 should transmit considerably more than one-half the incident light directly to frame A, say 70-80%. The remainder of the incident light is reflected to the surface 6 in front of lens 8 which, in turn, reflects it fully through lens 8 and through a blue filter 10 absorbing red and yellow. Owing to the natural blue sensitivity of both emulsion layers, frame B will contain the blue component record of the tri-color system recorded in both emulsion layers substantially without any differential action. As the blue sensitivity of these rapid emulsions is very high, full exposure may be obtained using only a relatively small percentage of the total light reflected from the subject photographed. The ratio of exposure of frames A and B will naturally be altered according to the source of illumination and other requirements of the materials actually employed. Filters having the absorption characteristics described are well known.

As the camera mechanism (not shown) pulls down two frames at a time for each exposure, double the normal length of film is used.

This negative sensitive material and the process of exposing it are the subjects of our prior Patent No. 1,969,469, granted August 7, 1934.

NEGATIVE PROCESSING—METHOD A

Step 1

After the negative is exposed, the film is developed and fixed as in ordinary photographic procedure. A developing formula is chosen which produces the minimum of selective hardening of the gelatine where the image develops. Diamino-phenol-sodium sulfite containing a small quantity of sodium bisulfite has been very satisfactory. Such a formula is

Formula I

| | | |
|---|---|---|
| Diamino phenol | grams | 5 |
| Sodium sulfite | grams | 10 |
| Sodium bisulfite | grams | 5 |
| Potassium bromide | grams | 1-4 |
| Water to | liter | 1 |

Alternatively, the film may be developed directly in a red color-forming developer to save steps in processing. However, excessive exposure seems to be necessary when development is to be carried out by this method; therefore the use of a normal black and white photographic developer for initial negative development is preferable, giving the maximum effective speed in the camera.

Step 2

The film is now immersed in dilute potassium ferricyanide to convert the silver images to silver ferrocyanide without local hardening of the gelatine. Silver ferrocyanide produced is very easily reducible back to metallic silver. A suitable bleach is

Formula II

| | | |
|---|---|---|
| Potassium ferricyanide | grams | 10 |
| Ammonia 28% | cc | 10 |
| Water to | liter | 1 |

Step 3

The next step is the exposure and re-development of the bleached images in a color-forming developer yielding insoluble monochrome dye images, together with re-developed silver. A red or magenta dye is required and has been satisfactorily obtained using cyanacetophenone or thio-indoxyl used with diethyl-paraphenylene-diamine in alkaline solution. The dye chosen must, besides permanence and insolubility, have the following two essential properties, thereby excluding certain of the available red couplers: (1) It must have as sharp an absorption band as possible, to afford an efficient printing image. As this image will print on the green sensitized layer of the positive film, the dye in this printing image should absorb as efficiently as possible the light in the sensitivity range of the green sensitive positive emulsion, and at the same time transmit as efficiently as possible all the light in the sensitivity range of the red sensitive positive emulsion. This red dye may, and in practice does, transmit blue light as well, for blue light is excluded altogether in positive printing and therefore plays no part in the printing process. (2) It must bleach easily in the chromic acid-bromide-alcohol bleach described later, and not be restored as dye in the subsequent stop bath used in connection with that bleach.

A suitable red color developer is

Formula III

| | | |
|---|---|---|
| Sodium carbonate | grams | 10 |
| Sodium sulfite | grams | 0.5 |
| Diethyl p-phenylene diamine HCl | grams | 0.5 |
| Water to | liter | 1 |

In 100 c. c. of this solution is dissolved 0.05 of brom-thio-indoxyl.

This color development of both layers must either be carried to completion or, if stopped before completion, must be followed by a hypo bath to remove any undeveloped silver ferrocyanide. After washing, the film is dried. This drying step is important, since we have found that the control in the following step is very much more accurate if the film is dried before the upper image is submitted to the differential treatment to be next described, because a processing bath intended to affect only the upper image penetrates a well dried layer much more slowly than it does a wet or moist layer.

Step 4

The next step is the critical one in the color differentiation between the two layers and depends on restricting the penetration of a bleaching solution to the depth of one layer only. An ordinary dilute water solution would penetrate the surface layer in 1 to 2 seconds. By using a high concentration of alcohol, the time may be greatly extended. A 75% methanol and 25% water solution containing chromic acid, hydrobromic acid and potassium bromide bleaches the surface layer in 15 to 30 seconds, depending upon temperature and the thickness of the emulsion coating.

The following is a satisfactory formula for this bleach:

Formula IV

| | | |
|---|---|---|
| Chromic acid, 10% solution | cc | 10 |
| Hydro-bromic acid, 41% solution | cc | 3 |
| Potassium bromide | grams | 2 |
| Methanol | cc | 300 |
| Water | cc | 90 |

The time of immersion in this bleach is carefully measured by trial, which is easily done, and after the bleaching bath the film is immediately immersed in a stop bath of this formula:

| | | |
|---|---|---|
| Ammonia 28% | cc | 5 |
| Water | cc | 100 |

The action of this bleach bath is to convert to silver bromide the silver in the top emulsion layer only and to bleach the dye formed with the silver image to a colorless compound which is very soluble in the alcohol of the bleach bath. The bleaching action would continue undesirably to the lower layer if not checked. Also, some of the undissolved bleached dye would be restored to color in the image again as the acid was gradually washed out of the film. To check the bleaching action quickly and prevent restoration of dye, the stop bath given is used with very satisfactory effect. An alternative formula for a stop bath is the following:

| | | |
|---|---|---|
| Methanol | cc | 400 |
| Sodium sulfite | grams | 20 |
| Ammonia 28% | cc | 10 |

Water to make 1 liter.

The sodium sulfite inhibits restoration of the dye, while the methanol dissolves out the bleached dye compound.

The step involving bleach and stop bath is most practicable in a processing machine where time and temperature control may be maintained within reasonable limits of variation. To allow for some error, the thin gelatine layer between the two emulsions has been found to afford sufficient tolerance. That layer may be about one-half the thickness of the emulsion coatings.

Step 5

The above differential treatment leaves the film with silver plus dye in the lower layer, and silver bromide in the upper layer. Therefore, subsequent immersion in a blue-green (minus red) color-forming developer, such as dichloro- or trichlor-alpha-naphthol with diethyl-paraphenylene-diamine, causes development only in the top layer where the image is formed of silver bromide. Of course, the film must be exposed to white light at this point to render the silver bromide developable.

A suitable blue-green color developer is the following:

Formula V

Solution A

| | | |
|---|---|---|
| Water | liter | 1 |
| Sodium carbonate | grams | 10 |
| Sodium sulfite | grams | 5 |
| Diethyl p-phenylene diamine HCl | grams | 2 |

Solution B

| | | |
|---|---|---|
| 2:3:4 trichlor-alpha naphthol | grams | 1 |
| Methanol | cc | 150 |

For use take

| | | |
|---|---|---|
| Solution A | cc | 100 |
| Solution B | cc | 15 |

After development in this bath, the film is then washed.

Step 6

The final step in processing the negative is to remove the silver image remaining in both emulsion layers, preferably by potassium ferricyanide and sodium thiosulfate, in combination or as separate baths, leaving a pure minus green dye image in the lower layer and a pure minus red dye image in the upper layer. For this bleach the well-known Farmer's reducer is satisfactory.

The finished film, washed and dried, has on frame A (the red-green differential two-color record) two color components 15 and 16 superposed and on frame B (the blue-monochrome record) only one color component existing actually at 17 and 18 in both layers, but for printing purposes existing in the top layer only, as will be fully explained in describing the positive printing process.

Negative Processing—Method B

This method may be used instead of that just described, and while it involves more steps than Method A, it has one advantage in minimizing any tendency to harden the gelatine in the image portions and, therefore, facilitates the attainment of satisfactory balance between the emulsions throughout the useful density range.

The film is developed, fixed, washed, and bleached in potassium ferricyanide to transform the images in both layers. The film is exposed and the top layer only is re-developed to silver by controlling the penetration of an energetic developer and arresting the development as soon as the desired depth is reached. To make the penetration of the developer sufficiently slow to permit adequate control, the developer solution is "loaded" by adding a large amount of sodium sulfate. The following formula represents a satisfactory example:

Formula VI

| | | |
|---|---|---|
| Hydro-quinone | grams | 12.5 |
| Sodium-sulfite | grams | 19.0 |
| Potassium hydroxide | grams | 41.0 |
| Sodium sulfate | grams | 200.0 |
| Water to | liter | 1 |

The time of penetration of this developer through the top layer only may be extended to 30–40 seconds, depending on temperature and emulsion thickness. The time of penetration will, of course, depend on the particular developer formula used. Development is arrested by immediate immersion in a stop bath kept at a very low temperature, say, between 0°–5° C. Such a stop bath is

Formula VII

| | | |
|---|---|---|
| Sodium bisulfite | grams | 50 |
| Glacial acetic acid | cc | 30 |
| Water to | liter | 1 |

In this control of development use is made of the long induction period of hydro-quinone, together with its sensitivity to temperature which is very marked. Satisfactory differentiation of treatment may be repeatedly obtained by this method.

The caustic hydro-quinone developer just mentioned has one disadvantage—it tends to harden the gelatine where the image develops. To avoid this, a concentrated amidol-sodium sulfite formula may be employed instead. A satisfactory formula is:

Formula VIII

| | | |
|---|---|---|
| Sodium sulfite | grams | 100 |
| Amidol | grams | 50 |
| Sodium sulfate | grams | 200 |
| Water to | liter | 1 |

With this developer, a stop bath of 50 cc. of glacial acetic acid in 1 liter of water, cooled to 0–5° C. is satisfactory, although the stop bath, Formula VII, just given, will also be satisfactory.

At this stage of the processing, the film contains a developable silver ferrocyanide image in the lower layer and a metallic silver image in the upper layer. Immersion in a red color developer as described under Method A, Step 3, is now carried out, depositing dye along with the silver of the image which is being re-developed in the lower layer only, the silver image in the upper layer being, of course, inert to the color developer. This color re-development of the lower layer may be either carried to completion or followed by a dilute hypo bath to remove undeveloped silver ferrocyanide. The film is now washed. The lower layer now contains red dye plus silver; the upper layer contains silver only.

The silver image in the upper layer only is bleached by controlled diffusion of a potassium ferricyanide bath, which converts the silver image to silver ferrocyanide. This bleach bath is also loaded with sodium sulfate to extend the time of penetration through one layer alone to 20–30 seconds, depending on temperature and emulsion thickness. A suitable bleach is

Formula IX

| | | |
|---|---|---|
| Sodium sulfate | grams | 200 |
| Potassium ferricyanide | grams | 50 |
| Water to | liter | 1 |

Here again the clear gelatine intermediate layer between the two emulsions affords leeway for possible error and excessive wantering of solutions. The bleaching action is arrested by immediate immersion of the film in a dilute solution of hydroxylamine hydrochloride and ammonia which rapidly converts the remaining potassium ferricyanide carried along in the gelatine to potassium ferrocyanide, the latter compound having no bleaching action. Such a suitable stop bath is

Formula X

| | | |
|---|---|---|
| Hydroxyl-amine hydrochloride | grams | 20 |
| Ammonia 28% | cc | 50 |
| Water to | liter | 1 |

This stop bath is used at room temperature.

Hydrazine or hydrazine sulfate may be substituted for hydroxyl-amine hydrochloride in the above formula.

The silver ferrocyanide image now in the top layer is exposed and developed in a blue-green color-forming developer, as described under Method A (Step 5, Formula V), to which the silver and dye in the lower layer are inert. When development has proceeded sufficiently far, the silver in both layers is simultaneously removed as described for the final step in Method A, Step 6, in potassium ferricyanide and hypo (Farmer's reducer), leaving a pure dye image in each layer. The film is then washed and dried and is in the same state as represented by Fig. 3.

Positive Material

On one side of the film base two emulsions are coated with an intermediate, very thin gelatine layer between them. These emulsions are coated respectively in the same order to approximately the same thickness and with substantially the same color sensitizing specified for the negative material. Accordingly, there is a green sensitive layer 21 next the support 20, then the intermediate gelatine layer 22, and then the red sensitive layer 23. These positive emulsions, however, are chosen for excessively fine grain, fine enough to render the appearance of the double-coated film only faintly translucent. As stated, each of these layers may be color-sensitized with the same sensitizing dyes used for the negative material. Both of these emulsions are predominantly of silver bromide.

On the reverse side of the film support is a thin coating 24 of slow emulsion, not necessarily transparent, sensitized to the infra-red region from about 750 to 850 m$\mu$. Over this coating is placed a water-proof stripping varnish layer 25 containing dye or lamp-black to serve also as backing necessary to avoid halation, due to reflection of red, green and infra-red rays from the rear emulsion-air interface. Benzyl cellulose has been found adaptable to this purpose, as it may be easily stripped from the emulsion surface when it is desired to process the infra-red sensitized coating as given below. A suitable varnish for this purpose is

Formula XI

| | | |
|---|---|---|
| Cellulose-benzyl ether | grams | 150 |
| Benzene | cc | 1550 |
| Toluene | cc | 100 |
| Xylene | cc | 400 |

Although this infra-red sensitive emulsion may be of the type described for the other two coatings, it is advisable to have it in the form of a pure silver chloride emulsion of whatever grain size may be necessary to secure sufficient latitude. An infra-red sensitizer which is suitable for this emulsion is neocyanine (thio-tricarbocyanine).

The infra-red sensitizing of such a chloride emulsion has been found to confer sufficient speed to infra-red light for practical purposes.

The reason for having this single emulsion coating composed of pure silver chloride is to permit of differential fixation in ammonia which will dissolve the silver chloride of this single layer without appreciably affecting the silver bromide formed in a subsequent bleaching step of the positive processing which will be described later.

This positive sensitive material is a modification of that described and claimed in our copending application, Serial No. 626,733, filed July 30, 1932.

Positive Exposure

It will be understood that both frames of the negative film belonging to each simultaneously exposed pair must be printed in register on a single frame of positive film. This may be accomplished in an optical printer of a form known to the art, in which the printing of the two frames is done simultaneously, one by simple projection onto the positive film and the image of the other frame being projected onto the back in register by an optical system of several prisms and lenses, a typical printer being shown in the U. S. patent to Capstaff 1,475,599, granted December 25, 1923.

We prefer, however, to carry out this printing by an arrangement which we believe to be novel, and which has great advantages of simplicity. This printer is illustrated diagrammatically in Figs. 6 and 7, the shutter being shown in Fig. 5. In this printer both negative and positive films, designated N and P respectively, travel intermittently, the former passing two frames successively past a single gate to every one frame of the positive film exposed at the other gate. Registration is important and may be insured by any of the well known expedients, such as by a uniform spring pressure from one side of each film gate, by accurate intermittent mechanisms, and by registration pins entering the film perforations at both gates while the films are at rest during exposure intervals. Since these are familiar mechanical details, they are not shown in full as they would tend to complicate the drawing and obscure the salient features.

Frame A of the negative containing two differential color components is to be exposed by yellow light (red plus green) excluding the extreme red and infra-red, thereby affecting the double coated side of the positive film only. Frame B of the negative containing the single blue record component in both layers (non-differentially), is printed by infra-red light of wave lengths 750-850 m$\mu$, thereby printing only on the infra-red sensitive emulsion on the reverse side of the positive film. The positive emulsions are particularly transparent to light of these longer wave lengths, resulting in a minimum loss of definition due to printing through two emulsions and through the film base to the coating on the reverse side.

The black varnish backing affords protection against halation. Blue light is excluded from the positive printing.

Figure 5:
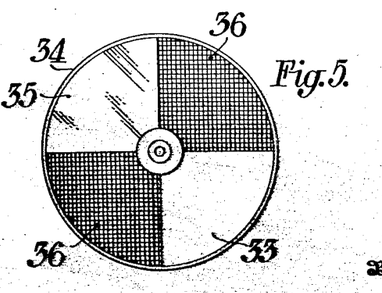
Fig. 5 is a diagram of the shutter of the printer.
Figure 6:
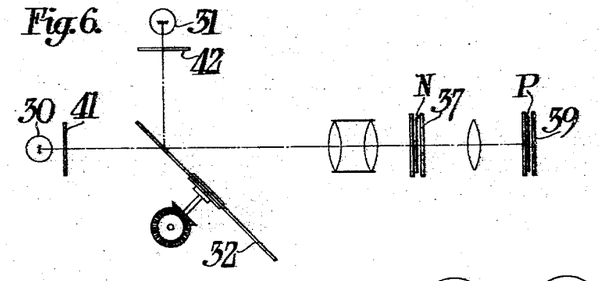
Fig. 6 is a diagrammatic plan of the printer.
Figure 7:
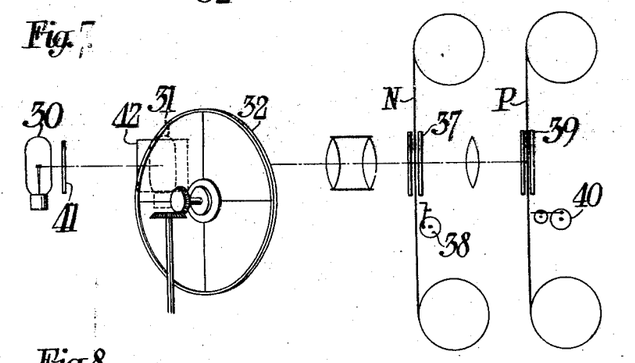
Fig. 7 is a diagrammatic side view of the printer.

In the printer shown diagrammatically in Figs. 6 and 7, two sources of light are employed as shown, each with stationary filters attached. One light source 30 is on the optical axis of the printer and the other 31 at right angles to it. A special type of shutter 32, shown in Fig. 5, is used, having one sector 33 open except for rim 34 and one fully reflecting mirror sector 35 opposite the open sector to transmit successively the suitably filtered light from the two light sources A and B in synchronism with the successive exposures of the alternate negative frames. The other two sectors 36 are opaque and non-reflecting.

The negative film N is driven past gate 37 by a pulldown mechanism shown conventionally at 38 and operating in timed relation with the shutter 32, such that the movement occurs as the opaque sectors 36 pass the optical axis. The positive film P is moved past gate 37 by a pulldown 40 of the type shown in Capstaff U. S. Patent No. 1,672,845, granted June 5, 1928, whereby the claw engages and advances the film only at every alternate stroke. This mechanism is so connected to the pulldown mechanism that it moves the film during alternate movements of film N.

In front of light 30 is a filter 41, of known type, which may be a combination of layers or dyes, excluding virtually all the extreme red and infra-red as well as blue during one printing exposure, while transmitting at the same time enough visible red and green light for printing the red and green color components. As an example, a dilute solution of cupric chloride has been satisfactorily employed as a filter absorbing infra-red. Less satisfactory for absorbing infra-red, though more convenient, are heat-resisting glasses of greenish color of well known type, whose absorption in the infra-red is relatively high compared to their absorption in the visible red. There should also be used in front of one light source a yellow filter, transmitting only green and red and no blue or infra-red, together with the above minus-infra-red filter. Such a suitable liquid filter cell of 1 cm. cell thickness will contain 2½% of cupric chloride in water. In front of the other light source 31, the filter 42 will consist of an infra-red filter of known type and also a glass or liquid filter to exclude a great deal of the infra-red light of wave lengths longer than 800 m$\mu$. A liquid filter of 1 cm. cell thickness containing ½% of cupric chloride is satisfactory for this purpose. The reason for excluding these higher wave lengths is that the blue-green dye used for the printing image in the negative film transmits the longer wave lengths more easily, thereby decreasing its effective contrast in printing.

The type of printer described is used to avoid having revolving liquid filter cells which might otherwise be required. It is, however, possible to design such a printer which would contain a shutter having two open sectors, as heretofore used in printing of this kind, one of the open sectors of the shutter containing one filter and the other the other filter.

The result of the optical printing as described is to print from a minus red colored image 15 in frame A of the negative film, representing the red record component, upon the red sensitized top coating 22 of the positive film, this printed image being processed to a minus red color. Similarly, from the minus green colored image 16 is printed a latent image in the green sensitive positive layer 21 and this processed to a minus green image. From the blue record components in frame B, is printed by infra-red light a latent image in the coating 24 of the positive. The minus red dye image 17 in the top layer of the negative film is also substantially minus infra-red and therefore prints effectively, whereas the red image 18 in the lower layer is virtually transparent to the infra-red, and therefore negligible in printing. The result is that each of the three-color components is printed in one layer only of the positive film.

*Positive Processing*

The positive processing may omit the first development and bleaching steps of Method A given above. It will be remembered that the positive has a water-proof varnish layer 25 on one side so that the double layer side only is treated at this point. The processing of the negative according to Method A consisted of the following steps:

1. Developing the two layers in the diaminophenol-sodium sulfite developer,
2. Bleaching in dilute potassium ferricyanide,
3. Re-developing the bleached images in a red color developer and then drying,
4. Treating the film in a bleach which is restricted to the depth of one layer only,
5. Development in a blue-green color developer and
6. Removing with Farmer's reducer the silver images remaining.

The positive is immediately developed as in Step 3 above, and fixed. For the red color developer of Step 3, we prefer the following solution for the positive red image:

*Formula XII*

| | | |
|---|---|---|
| Water | liter | 1 |
| Diethyl para phenylene diamine HCl | grams | 10 |
| Sodium sulfite | grams | 5 |
| Sodium carbonate | grams | 20 |
| Potassium bromide (molar solution) | cc | 2 |

To 100 cc. of this solution add brom-thio-indoxyl 0.05 g.

It is then bleached as in Step 4 and at this stage, where the top layer only of the double coating has been bleached to silver bromide and the dye in that layer removed coincidentally, the protective varnish 25, is stripped from the infra-red sensitive layer 24 on the reverse side. This varnish layer is easily stripped when dry. The film is now immersed in a pure yellow (minus blue) color-forming developer. Benzoyl acetones and aceto-acetic esters have been employed as couplers with diethyl-para-phenylene-diamine as developer. Other yellow couplers are possible and available.

A suitable formula for the yellow color developer is

*Formula XIII*

| | | |
|---|---|---|
| Water | liter | 1 |
| Diethyl p-phenylene diamine HCl | grams | 10 |
| Sodium sulfite | grams | 5 |
| Sodium carbonate | grams | 20 |
| Potassium bromide (molar solution) | cc | 2 |

To 100 cc. of this solution, are added benzoyl acetone 0.1 g. dissolved in ethyl alcohol 5 cc.

This furnishes the third subtractive positive color component corresponding to the original blue negative record which, it will be remembered, has been printed by infra-red on the single coating on the reverse side of the positive.

After the yellow development, the film is immersed in dilute ammonia, approximately 4%, to fix out the undeveloped silver chloride in the infra-red sensitive layer without affecting the silver bromide formed by the bleach bath in the top layer of the double coating. This silver bromide is therefore the only developable deposit in the film and is developed after exposure to white light in a minus red color-forming developer which may be of the same type as that given in Step 5 of the negative processing Method A.

After thorough washing, the residual images remaining in all three emulsions are simultaneously removed as described under Negative Processing, Method A, Step 6. This step involves a simple reduction by Farmer's reducer.

Figure 8:
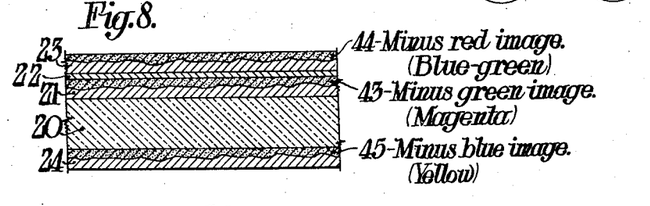
Fig. 8 is a cross-section of the positive film after processing.

The film is now washed and dried and is a complete three color subtractive picture, as shown in Fig. 8 in which there are shown in the three original layers 23, 21 and 24 respectively, the dye images, 44, 43 and 45 which successively absorb red, green and blue, and by the subtractive process transmit a properly colored three-color image.

Numerous variations in the process as outlined may be made, of which the following are examples:

If the finished processed negative as described above is printed in a contact printer by yellow light on positive material double-coated but without the third varnished infra-red sensitive emulsion on the reverse side, and if it be processed according to either Method A or Method B under "Negative Processing", a master positive will result. Repetition of this process will result in a master negative.

To avoid excessive re-duplication and consequent loss in quality, the master positive just described may be put through an ordinary reversal treatment after exposure and thereafter processed by Method A or B, "Negative Processing," yielding a direct master negative on fine-grained film but otherwise a substantial duplicate of the original negative in every respect.

In making these master positive or master negative prints, it will be of advantage to use as a source of printing light not yellow light but additive red plus green light from two nearly monochromatic light sources which will minimize the loss of color intensity due to excessive reduplication.

If all three coatings of the positive film are bromide emulsions prohibiting differential fixation in ammonia as described, it is necessary to employ methods of flotation or other mechanical means in differentially processing opposite sides of the film. These are practicable and may be used to avoid the necessity of water-proofing one layer with varnish but appear less useful than the one fully described above.

The color sensitizing of the layers of the negative may be changed altogether from that described. The sensitivity range may be quite different from that mentioned. The two layers of the negative may be coated in the reverse order. The intervening thin gelatine layer between the two layers of the negative may contain a dye to act as a screen for the layer underneath.

The colors chosen for processing the negative may be changed, as green and red need not necessarily be used. A blue and a yellow, or a blue green and orange yellow, may be used to form efficient printing images, in which case the double coating of the positive described will have two emulsion layers sensitized to blue and to orange respectively, in either order.

The order of the emulsion layers of the positive with respect to the direction of light from the printer may be changed.

Owing to the length of the foregoing description, it may be of advantage to summarize the steps.

Negatives

Double coated red and green sensitized film is exposed in a split-beam camera, two frames at a time through yellow and blue filters respectively. This is developed, fixed, bleached and re-developed in one color. The top layer is then bleached and redeveloped in a second color. The silver is removed leaving pure dye images. Method A described above is the simplest for carrying out these steps.

Positives

The film has coated red and green sensitive transparent emulsions on one side of the support and an infra-red sensitive coating on the reverse side, this being protected by a waterproof, stripping, anti-halation varnish coating. The positive is exposed one frame at a time for each two negative frames in a special optical printer using red and green light for one negative frame and infra-red light for the other. It is developed to magenta and fixed. The top layer is bleached. The stripping layer is removed from the infra-red emulsion which is developed yellow and fixed in ammonia. The bleached top layer on the double coated side is exposed and redeveloped to a blue-green. The silver in all layers is removed, leaving pure dye images.

While we have described this process and designed it particularly for a color motion picture process, we do not wish to be limited to the motion picture field. Similar methods could be applied to the making of still pictures on either plates or films.

We consider as included within our invention all modifications and equivalents coming within the scope of the appended claims.

Having thus described our invention, what we claim and desire to be secured by Letters Patent of the United States is:

1. The process of producing a three color photographic record which comprises forming in one area two differentially color sensitized layers in superposition two registering images of the same subject, the images being different color sensation records thereof, and forming in another area of the same layers a third different color sensation record of the same subject, the images thus formed in one layer being of different color than those in the other layer, exposing the same area of a sensitive film carrying three differentially color sensitized layers to printing light of three different colors transmitted by said three color sensation records respectively, the three different colors being those to which the layers are differentially sensitive thereby forming in each sensitive layer a color sensation record, and then transforming said last named three color sensation records into images of different suitable complementary colors.

2. The process of producing a three color photographic record which comprises forming in one area two differentially color sensitized layers in superposition, two registering images of the same subject, the images being different color sensation records thereof, and forming in another area of the same two layers, a third different color sensation record of the same subject, the images so formed in the same layer being of the same color, printing from the images so produced upon a photographic element comprising a support having on one face superposed green sensitive and red sensitive layers, and on the reverse side of said support a layer sensitive to the infra-red; said printing comprising exposure to red and green light through the area containing the red and green sensation records and exposure to infra-red light through the area containing the blue sensation record.

3. The process of producing a three color photographic record which comprises forming in one area green and red color sensitized layers in superposition two registering images of the same subject, the images being green and red component records thereof and forming in another area of the same two layers a blue record of the same subject; transforming the images in the green sensitive layer to a red or minus green color and the images in the red sensitive layer to a green or minus red color; printing from the said images upon a positive film comprising a support carrying on one face a green sensitive emulsion layer, over said green sensitive emulsion layer another layer sensitized to red, and on the reverse side an emulsion layer sensitive to the infra-red; said printing comprising exposure to red and green light through the area containing the red and green sensation records and exposure by infra-red light through the area containing the blue sensation record; and transforming the printed green component record to minus green, the printed red component record to minus red, and the printed blue component record to yellow.

4. The process of producing a three color photographic record which comprises exposing to two separate images of the same subject two areas of a film coated with differentially green and red sensitized layers in superposition, one of said images being predominantly of red and green light, thereby recording a red component image in one layer and a green component image in the other layer of said area, and the other image being predominantly of blue light, thereby recording a blue component image in both layers of said other area; transforming the images in the green sensitive layer to a red or minus-green color and the images in the red sensitive layer to a green or minus-red color; printing the negative film so produced upon a positive film comprising a support having on one face a green sensitive layer and a red sensitive layer, and on the reverse side a layer sensitive to the infra-red; said printing comprising the exposure of the positive film to only red and green light transmitted through the picture area containing the red and green component images and the exposure of the infra-red sensitive layer to only infra-red light transmitted through the picture area containing the blue sensation record, and transforming the latent images thus produced in the three layers of the positive film each to a suitable color.

5. The process of producing a three color photographic record which comprises exposing to two separate images of the same subject two areas of a film coated with differentially green and red sensitized layers in superposition, one area being exposed through a yellow filter, thereby recording the red record in one layer and the green record in the other layer of said area, and the other area being exposed to a blue filter, thereby recording the blue record in both layers of said other area; processing the green sensitive layer to a red or minus green color and the red sensitive layer to a green or minus red color; printing the negative film so produced on a positive film comprising a support, on one face of said support a green sensitive emulsion layer, over said green sensitive emulsion layer another layer sensitized to red, and on the reverse side of said support an emulsion layer sensitive predominantly to the infra-red; said printing comprising the exposure of the positive film through a yellow filter to the picture area containing the red and green sensation records and the exposure of the infra-red sensitive positive layer by infra-red to the picture area containing the blue sensation record; and processing the green positive record to minus green, the red positive record to minus red, and the blue positive record to yellow.

6. A photographic element comprising a support, two superposed layers on one face of the support, complementary color images of a subject in registry in said layers in one area of the element, and images of a third color component of the same subject in registry in said layers in another area of said element, the images in one layer transmitting green light and absorbing red light and the images in the other layer transmitting red light and absorbing green light, and the images in one of the layers absorbing infra-red light and images in the other of the layers transmitting infra-red light.

7. In a process of producing a three color photographic record which comprises forming separate color sensation records in a film having two superimposed color sensitive layers, the steps which comprise forming a blue sensation negative record only in one picture area but in both layers, and transforming the records into images of different colors, one of which is absorptive to light of a definite color which the other image transmits, and then printing from said record by light of said color.

8. In a process of producing a three color photographic record which comprises forming separate color sensation records in a film having two superposed color sensitive layers, the steps which comprise forming a blue sensation record only in one picture area but in both layers, and transforming the two records into images of different colors, one of which is transparent to infra-red light and the other absorbing infra-red light, and printing from said blue sensation negative record by infra-red light.

9. A photographic element comprising a support and two sensitive layers thereon, one layer including silver bromide as the sensitive salt and the other layer including silver chloride as the sensitive salt, whereby the silver chloride can record an image of infra-red light to which the silver bromide layer is insensitive and can be fixed in a solvent for silver chloride which is not a solvent for silver bromide.

10. A photographic film comprising a support, two superposed layers, color sensitive to two different regions of the visible spectrum, carried on one side of the support, and a third layer sensitive to the infra-red region of the spectrum carried on the other side of the support.

11. A photographic film comprising a support, a green sensitive layer on one face of the support, another layer sensitized to red and superposed on said green sensitive layer and a layer sensitive to the infra-red carried on the reverse side of the support.

12. A photographic film comprising a support, two superposed uncolored sensitized layers on one face of said support, one a green sensitive layer and the other a red sensitive layer, a thin coating of clear gelatin between the green and the red sensitive layers, and on the reverse side of said support a layer sensitive to infra-red.

13. A photographic film comprising a support, two superposed layers carried on one face of the support, one being an uncolored layer sensitive to green but not to red or infra-red, and the other an uncolored layer sensitized to red but not to green or infra-red, a thin coating of clear gelatin between the green and the red sensitive layers, and on the reverse side of said support a layer sensitive to infra-red but not to red or green.

14. A photographic film comprising a support, two superposed layers on one face of said support, one a green sensitive gelatino-silver halide and the other a red sensitive gelatino-silver halide layer, and on the reverse side of said support an emulsion layer containing silver chloride and sensitive to infra-red.

15. A positive film comprising a support, on one face of said support a green sensitive emulsion layer consisting largely of silver bromide in gelatin, over said green sensitive emulsion layer another layer sensitized to red and also consisting largely of silver bromide, a thin coating of clear gelatin between the green and the red sensitive layers, and on the reverse side of said support an emulsion layer of silver chloride sensitive to the infra-red and a removable, waterproof, anti-halation layer over said last named emulsion layer.

16. A photographic film comprising a support, superposed layers on one side of said support, one a green sensitive gelatino-halide emulsion and the other a red sensitive gelatino-halide emulsion layer, on the reverse side of said support an emulsion layer sensitive to the infra-red, and over said last named layer a thin, waterproof readily removable, non-halation layer.

17. A photographic film comprising a support, two superposed layers, color sensitive to two different regions of the visible spectrum, carried on one side of the support, and a third layer sensitive to a third region of the spectrum carried on the other side of the support and over said last named layer a thin, waterproof, readily removable colored protective anti-halation layer.

18. In a method of processing in colors a photographic element having a silver bromide emulsion layer and a silver chloride layer the step of treating differentially the layers of the element with a solution containing ammonia whereby the silver chloride is dissolved out of one layer but the silver bromide in the other layer is unaffected.

19. In a process of printing upon a film having three differentially sensitized layers, only one of which is sensitive to infra-red light, from a two layer film containing three separate color records of the red, green, and blue sensations respectively, one of the layers being colored red and containing the blue and red sensation records in adjacent areas, and the other layer being colored green and containing the blue and green sensation records in corresponding adjacent areas, the blue sensation record in the two layers being superposed, the steps of printing the red and green sensation records by a single beam of red and green light only, and printing the blue sensation record by infra-red light through the two layers on which the red and green records have been printed.

20. In a process of printing upon a film having three differentially sensitized layers, only one of which is sensitive to infra-red light, from a two layer film containing three separate color records of the red, green and blue sensations respectively one of the layers being colored red and containing the blue and red sensation records in adjacent areas, and the other layer being colored green and containing the blue and green sensation records in corresponding adjacent areas, the blue sensation record in the two layers being superposed, the steps of printing the red and green sensation records by a single beam of red and green light only, and printing the blue sensation record by infra-red light through the two layers on which the red and green records have been printed, the layer which is sensitive to infrared light including silver chloride as the sensitive material.

LEOPOLD D. MANNES.
LEOPOLD GODOWSKY, Jr.